Feb. 5, 1924.

F. X. VAN AUSDAL 1,482,718

AUTOMOBILE BED

Filed Oct. 23, 1922

Inventor;
Francis X. Van Ausdal, per A. K. Martell
Attorney.

Patented Feb. 5, 1924.

1,482,718

UNITED STATES PATENT OFFICE.

FRANCIS X. VAN AUSDAL, OF PASADENA, CALIFORNIA.

AUTOMOBILE BED.

Application filed October 23, 1922. Serial No. 596,133.

*To all whom it may concern:*

Be it known that I, FRANCIS X. VAN AUSDAL, a citizen of the United States, residing at Pasadena, in the county of Los Angeles and State of California, have invented new and useful Improvements in Automobile Beds, of which the following is a specification.

My invention relates to improvements in automobile beds; and the objects of my improvement are, first, to produce a device of this nature that is collapsible and adapted for use either as a bed, a cot, or as a couch to sit upon; second, to provide means whereby said device may be made to co-act with other parts of the vehicle to become a convenient luggage carrier; and, third to afford ready means, cooperating with said vehicle, for enclosing said device.

Other objects and advantages will appear hereinafter and while I show herewith, and will describe a preferred form of construction, I desire to be understood that I do not limit myself to such preferred form, but that various changes and adaptations may be made therein without departing from the spirit of my invention as hereinafter claimed.

My objects are attained by means of the construction disclosed in the accompanying drawing, in which:—

Figure 1:
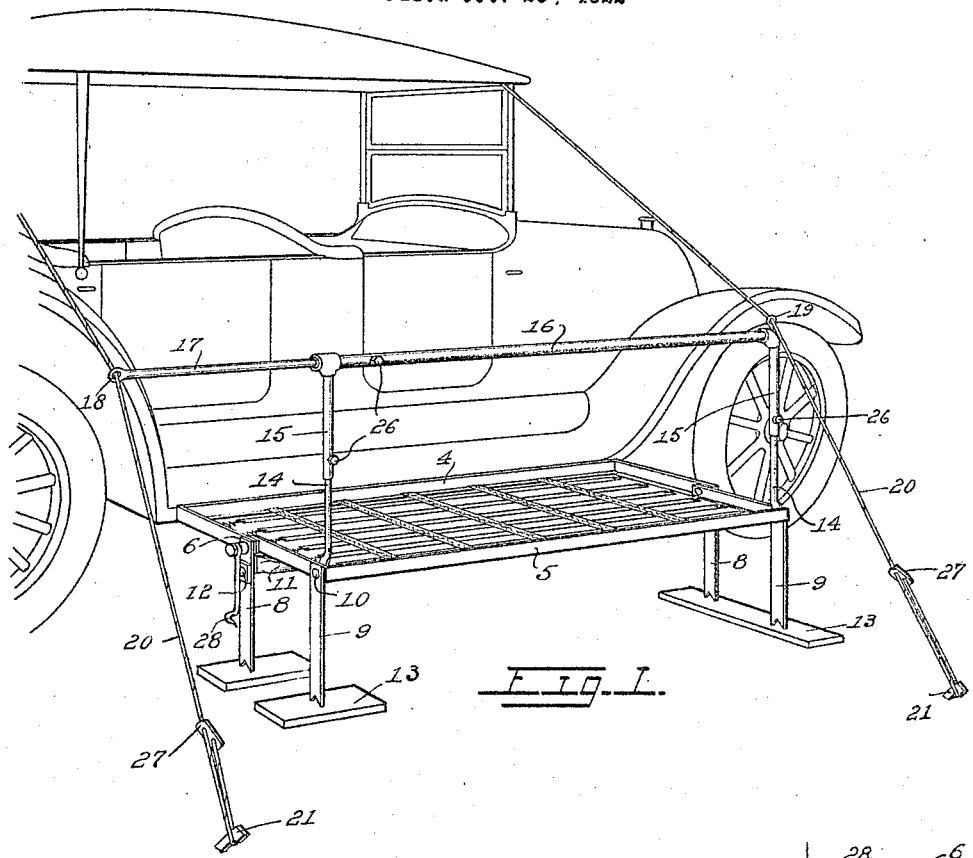
Figure 2:
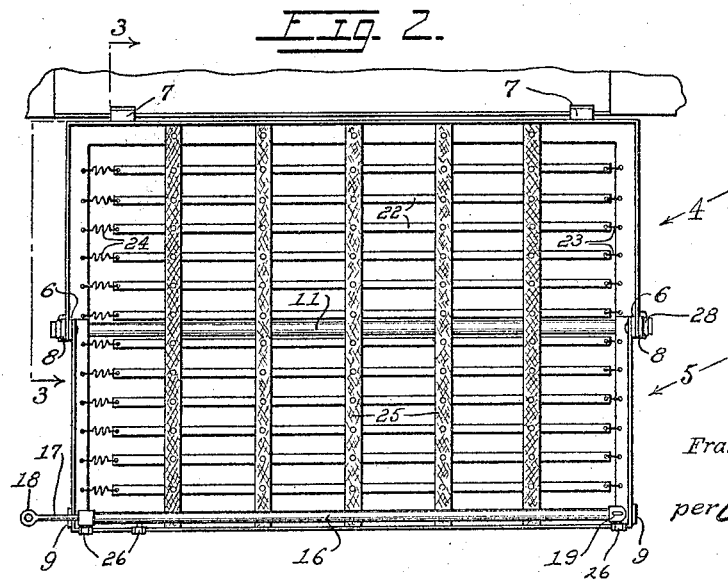

Figure 1 is a perspective view of an automobile with my invention attached thereto; Figure 2 is a fragmentary plan view of the same; and Figure 3 is an elevation of the device and section through the running board of the automobile taken on the line 3—3 of Figure 2.

Similar numerals refer to similar parts throughout the several views.

The frame of my bed is preferably made of angle steel in two rectangular three sided parts, as 4 and 5, pivotally connected to each other at 6. Part 5 is made slightly smaller than part 4 and may be constructed of smaller section steel so that it may be folded entirely within the latter, as shown in Fig. 3.

Figure 3:
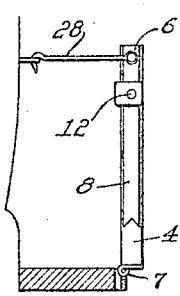

Part 4 of the frame is hinged to the running board of an automobile, as at 7, and in such a manner that it may be extended horizontally therefrom, as shown in Figs. 1 and 2, or placed vertically, as in Figure 3.

There are two pairs of folding legs or standards for supporting the bed when extended. The inner pair 8 of these legs is pivoted to the frame at 6, making use of the same pins that connect the two parts of the frame. The outer two legs 9 are pivoted at 10 to the outer corners of the frame.

Legs 8 are spaced by the pipe strut 11, close to their upper ends. This is to prevent the frame from collapsing inwardly when being used for its intended purpose. A convenient form of construction in this respect is depicted in the drawing, and consists of flattening the ends of the pipe, bending these ends around the outside of the legs, and riveting them to the latter at 12. In this manner the strut is prevented from interfering with the compact folding of the bed.

The two parts of the frame, where they are pivotally connected, are spaced by washers so as to allow legs 9 to be folded alongside the end members of part 5, and make it possible for them to be stowed within the end members of part 4 when the bed is folded up.

The bottom extremity of each leg is preferably made forked as shown. This enables them to be supported, without danger of shifting, upon small pieces of boards 13, as indicated; or they may even be supported by round sticks.

In this manner it is perfectly feasible to make use of the invention on sand, or soft ground, since it is nearly always possible to find some pieces of wood or similar material that will serve as footings for the legs.

Pivotally connected to the outer corners of the bed at 10, on the inside of part 5, is a telescoping tent frame comprising the swinging support members 14, the vertically adjustable members 15, the horizontal spanner 16 and the horizontally adjustable extension rod 17. This whole tent frame may be made in such a manner as to allow collapsing and folding entirely within part 5; or it may be made as shown where rod 17 is removed before folding.

Rod 17 has an eye 18 at its outer end, and another eye 19 is provided at the further extremity of the tent frame. These allow for properly spacing the tent ropes 20, which are stretched between the automobile and tent pins 21 driven in the ground. A canvas cover (not shown) is stretched over the ropes, and the telescoping tent frame, to form satisfactory enclosed sleeping quarters.

The spring mattress may be of any suitable and approved construction. As illustrated it comprises steel ribbons 22 attached to one end of the frame by links 23, and at the other end by the helical tension spring 24. Webbing strips 25 are riveted to the side members of the frame and to each of the ribbons, and serve to keep the latter properly spaced.

Adjustment of the several cooperating parts of the invention is made by means of the set screws 26 and cinch blocks 27 in a manner that will be obvious. Hooks 28 serve to retain the device in proper position when folded for transportation, or for use as a luggage carrier.

I desire to call especial attention to the three-fold utility of my invention, viz, as a tent enclosed bed; as a couch or cot; and as a convenient carrier of bulky luggage such as is usually necessary on tours or camping trips.

I claim:

1. A mattress attachment for an automobile consisting of an inner frame section having means on its inner side for hinging the same to the running board of the automobile, an outer frame section with pivoted connections attaching its ends to the ends of the inner frame section, inner legs pivotally attached respectively at the said pivotal connections on the outer side of the ends of the inner frame section, and constructed to fold into line with the ends of the inner frame section, distance washers between the ends of the two frame sections at the said pivoted connections, outer legs pivotally attached respectively at the outer sides of the ends of the said outer frame section, said outer frame section operating to fold into juxtaposition over the inner frame section with the outer legs in the space between the ends of the frame sections and in line with the said washers, and means attached to the said pivotal connections having means for detachably connecting to the side of the automobile to hold the folded frame sections in a substantially vertical position.

2. A mattress attachment for an automobile consisting of a frame with hinges on one side for attaching the same to the running board of the automobile, said frame consisting of two frame sections with a pair of aligning pivot connections having their axes extending parallel with the said side carrying the hinges, a foldable leg connected to the frame at each of said pivot connections, a foldable leg connected to the outer side of the frame at each end, the outer frame section operating to fold into juxtaposition with the inner frame section, means carried by the frame adjacent the said pivot connection for supporting the juxtaposed frame sections in a substantially vertical position, a tent frame having extensible arms pivotally connected to the outer ends of the outer frame section and having a substantially horizontal spanner bar, and constructed to fold down upon the outer frame section, said tent frame having eyes at its ends and guy ropes passing through said eyes having means for attaching their lower ends to ground pegs, and adapted to be attached at their upper ends to the automobile.

FRANCIS X. VAN AUSDAL.